United States Patent
Fujii et al.

(10) Patent No.: US 7,164,513 B2
(45) Date of Patent: Jan. 16, 2007

(54) BRACKET EQUIPPED WITH A PAPER RELEASER MECHANISM

(75) Inventors: Mamoru Fujii, Nara (JP); Kenichi Shiraishi, Nara (JP); Hideyuki Miyake, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 880 days.

(21) Appl. No.: 10/230,342

(22) Filed: Aug. 29, 2002

(65) Prior Publication Data

US 2003/0053152 A1    Mar. 20, 2003

(30) Foreign Application Priority Data

Aug. 30, 2001   (JP)   ............................. 2001-261883

(51) Int. Cl.
*H04N 1/04*    (2006.01)
*H04N 1/40*    (2006.01)
*B65H 29/20*   (2006.01)

(52) U.S. Cl. ...................... 358/498; 358/496; 358/483; 271/314

(58) Field of Classification Search ................ 358/498, 358/496, 483, 471, 474; 271/314
See application file for complete search history.

(56) References Cited

U.S. PATENT DOCUMENTS 5,579,128 A * 11/1996 Cheng ........................ 358/471
5,621,544 A *  4/1997 Ogura et al. ................ 358/494
5,982,512 A * 11/1999 Kim ............................ 358/498

FOREIGN PATENT DOCUMENTS

JP          A-8-65446        3/1996

* cited by examiner

*Primary Examiner*—Jerome Grant
*Assistant Examiner*—Houshang Safaipour
(74) *Attorney, Agent, or Firm*—Birch, Stewart, Kolasch and Birch, LLP

(57) ABSTRACT

A bracket that rotatably supports a shaft provided along the axis of a back roller for feeding and thereby transporting a document pinched between the back roller and a close-contact-type image sensor elastically supported on a cabinet and that is fitted to the cabinet so as to be rotatable about the shaft is formed integrally with a release lever for releasing the back roller and the close-contact-type image sensor from a state in which they are pressed against each other.

3 Claims, 3 Drawing Sheets

BRACKET EQUIPPED WITH A PAPER RELEASER MECHANISM

BACKGROUND OF THE INVENTION

1. Field of the Invention

The present invention relates to a bracket equipped with a paper releaser mechanism for use in the document reader portion of a facsimile machine or the like, and to a document reading apparatus employing such a bracket.

2. Description of the Prior Art

In a facsimile machine or the like that employs a close-contact-type image sensor as a document reading means, the document reader portion thereof is, for example as disclosed in Japanese Patent Application Laid-Open No. H8-65446, structured as follows. In the path through which a document P is transported, a back roller and an image sensor portion pressed against it with a spring are provided, so that the image on the document fed in by the back roller is read continuously while the image is kept pressed against the reading surface of the image sensor.

In a document reader portion that employs a pressure-contact-type image sensor like this, when a document jams in the transport path, it remains pinched between the back roller 1 and the image sensor portion. Thus, to remove the document, the back roller and the image sensor portion need to be detached from each other.

For this reason, the back roller and the image sensor portion are so structured as to be detachable from each other so that, when a document needs to be removed, one of the back roller and the image sensor portion is retracted to a detached position. According to the Japanese Patent Application Laid-Open No. H8-65446 mentioned above, at each end of the shaft of the back roller, a release lever with a cam is fitted so that, as the release levers are swung, the cams permit the image sensor portion to move up and down.

However, the conventional paper release mechanism described above (Japanese Patent Application Laid-Open No. H8-65446) requires extra parts, namely the release levers fitted on the shaft of the back roller, and thus has disadvantages of increasing the number of parts, complicating the structure, increasing assembly time, and the like.

SUMMARY OF THE INVENTION

An object of the present invention is to provide a bracket equipped with a paper release mechanism which has a simple structure and thus saves assembly time, and a document reading apparatus employing such a bracket.

To achieve the above object, according to one feature of the present invention, a bracket that rotatably supports a shaft provided along the axis of a back roller for feeding and thereby transporting a document pinched between the back roller and a close-contact-type image sensor elastically supported on a cabinet and that is fitted to the cabinet so as to be rotatable about the shaft is formed integrally with a release lever for releasing the back roller and the close-contact-type image sensor from a state in which they are pressed against each other.

In this structure, the release lever for releasing the back roller and the close-contact-type image sensor from a state in which they are pressed against each other is formed integrally with the bracket. This makes it possible to remove a jammed document easily in a simple structure without requiring extra parts.

According to another feature of the present invention, the bracket has a projection formed thereon which, by making contact with the close-contact-type image sensor, detaches the close-contact-type image sensor from the back roller.

In this structure, when the release lever is operated, the projection formed on the bracket makes contact with the close-contact-type image sensor and detaches it from the back roller. The projection is formed integrally with the bracket. This helps simplify the structure without requiring extra parts.

According to still another feature of the present invention, the bracket is formed integrally with a disengagement-preventing portion that is guided along a disengagement-preventing guide portion formed in the cabinet.

In this structure, the disengagement-preventing portion that is guided along the disengagement-preventing guide portion formed in the cabinet is formed integrally with the bracket. This helps prevent the bracket from disengaging from the cabinet.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, a bracket equipped with a paper release mechanism according to the invention will be described with reference to the drawings.

Figure 1:
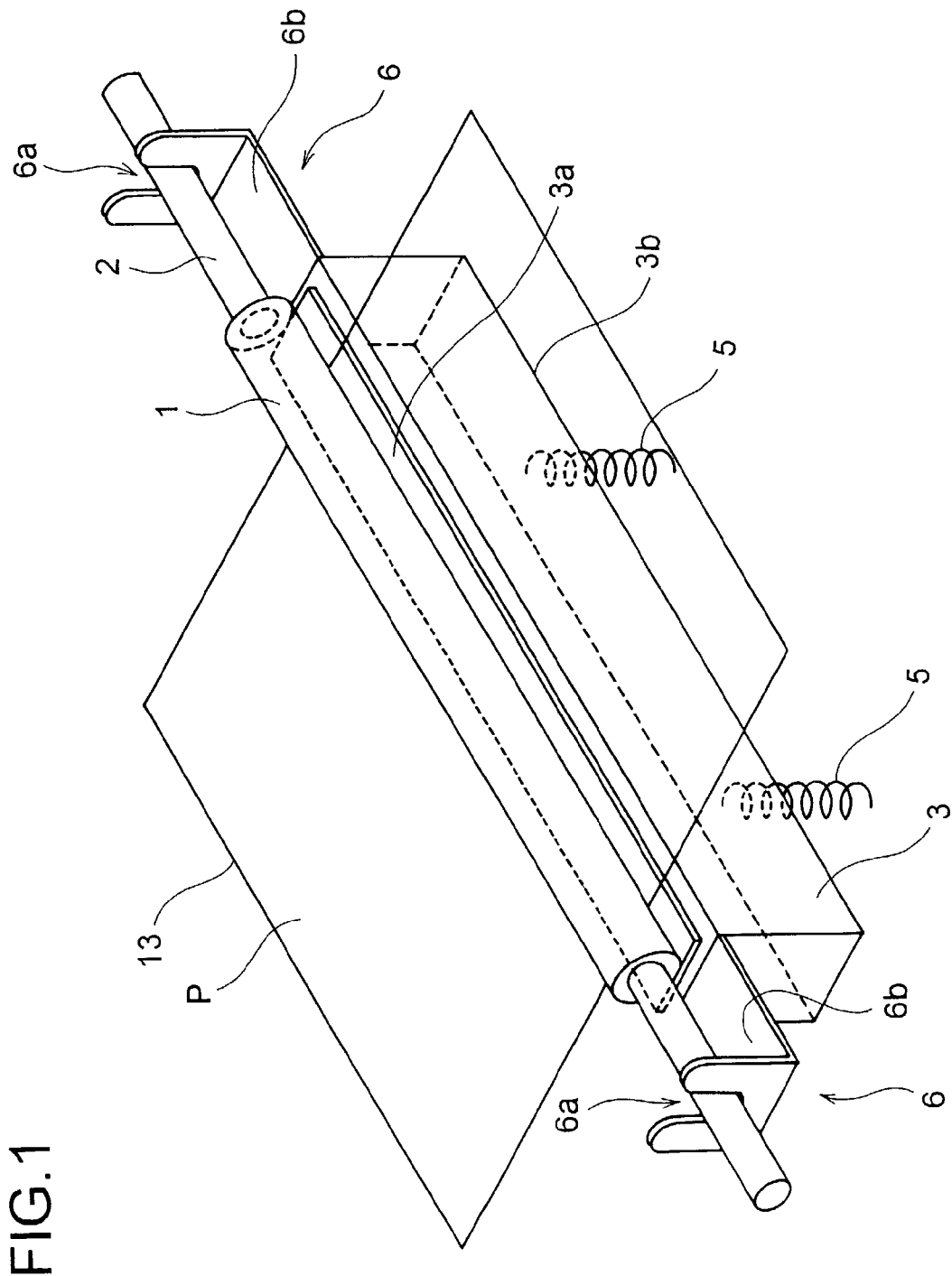
FIG. 1 is an exposed perspective view showing the basic structure of the bracket equipped with a paper release mechanism according to the invention, as used in a facsimile machine.
Figure 2:
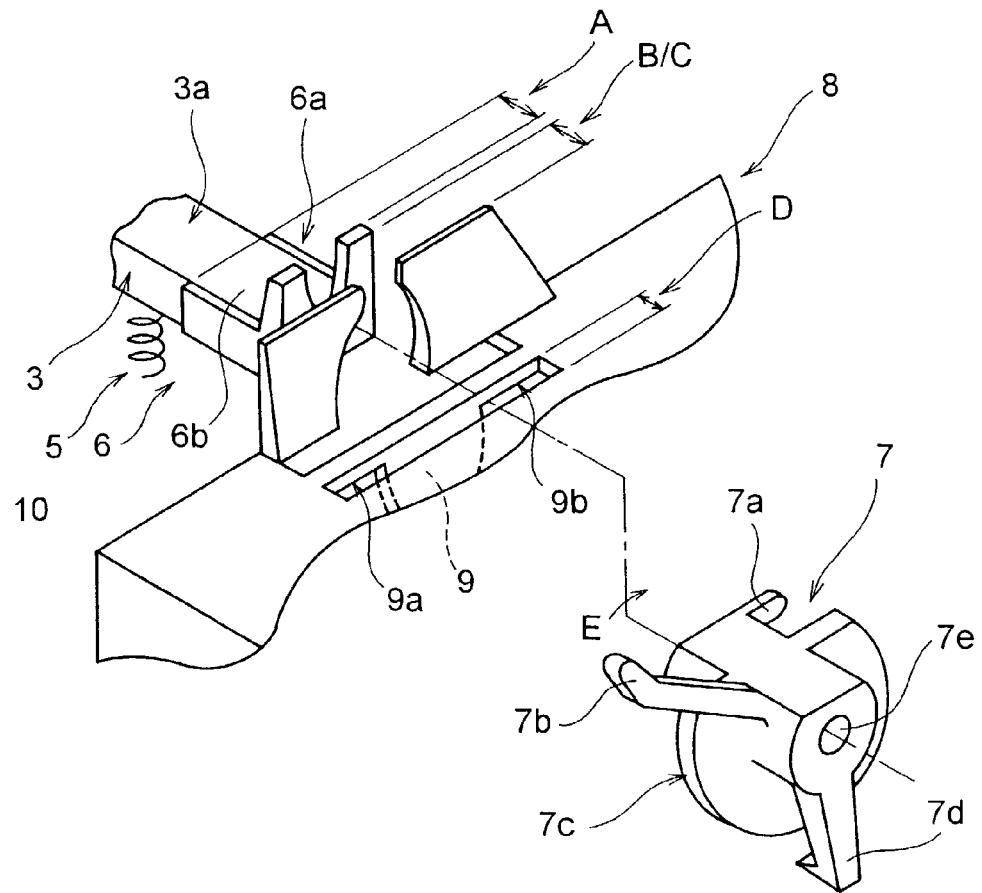
FIG. 2 is a perspective view illustrating how the bracket is fitted.

FIG. 1 shows the basic structure of the document reader portion of a facsimile machine or the like, and FIG. 2 shows how the bracket equipped with a paper release mechanism is fitted. In these figures, reference numeral 1 represents a back roller made of rubber for feeding and thereby transporting a document P, reference numeral 2 represents a shaft provided along the axis of the back roller 1, and reference numeral 3 represents a close-contact-type image sensor (CIS) shaped like a box and supported elastically against the back roller 1, with reference numerals 3a and 3b respectively representing a reading portion and a bottom portion thereof. The bottom portion 3b of the close-contact-type image sensor 3 is, in two places, elastically supported by springs 5 so that the reading portion 3a thereof is kept pressed against the peripheral surface of the back roller 1.

Although not illustrated, the shaft 2 of the back roller 1 is coupled through a transmission mechanism to a mechanical power source. In response to a read command, the back roller 1 is driven to rotate, and while it feeds and thereby transports a document P pinched between it and the close-contact-type image sensor 3, the image on the document P is read by the reading portion 3a. Even if the document P jams meanwhile, the user can easily remove it by detaching the close-contact-type image sensor 3 from the back roller 1.

Now, how this is achieved will be described. The shaft 2 is supported and kept in position by being, at both ends, fitted into guide portions 6a, which are U-shaped cuts formed in the upward bent ends of plate members 6 provided so as to protrude horizontally sideways from both ends of a top portion of the close-contact-type image sensor 3. The shaft 2 is also rotatably supported on brackets 7 equipped with a paper release mechanism (hereinafter simply the "brackets").

As shown in FIG. 2, integrally formed with each of the brackets 7 are a projection 7a that makes contact with the plate member 6 protruding from the close-contact-type image sensor 3, a release lever 7b, a rotation guide 7c, a disengagement-preventing claw (disengagement-preventing portion) 7d, and a shaft hole 7e. The brackets 7 are each molded integrally out of, for example, a flexible synthetic resin, and thus can be produced inexpensively.

The projection 7a, on the bottom surface thereof, makes contact with the top surface 6b of the plate member 6. The rotation guide 7c fits inside a disengagement-preventing guide portion 9 formed substantially in the shape of a semicircle downward in a side portion 8 of a cabinet. The disengagement-preventing claw 7d fits outside the disengagement-preventing guide portion 9. Placed through the shaft hole 7e is the shaft 2. Specifically, as shown in FIG. 2, the bracket 7 is fitted with the projection 7a located in the region A, the release lever 7b and the rotation guide 7c in the region B/C, and the disengagement-preventing claw 7d in the region D.

In this state, the shaft 2 is supported on the bracket 7, and the disengagement-preventing guide portion 9 is sandwiched between the rotation guide 7c and the disengagement-preventing claw 7d of the bracket 7. Thus, when the release lever 7b is operated, the disengagement-preventing claw 7d slides along the semicircular edge of the disengagement-preventing guide portion 9, and thereby functions as a stopper. That is, as shown in FIG. 3, the bracket 7 is permitted to rotate as long as the disengagement-preventing claw 7d remains between limits 9a and 9b provided by the bottom surface of the side portion 8 of the cabinet.

Figure 3:
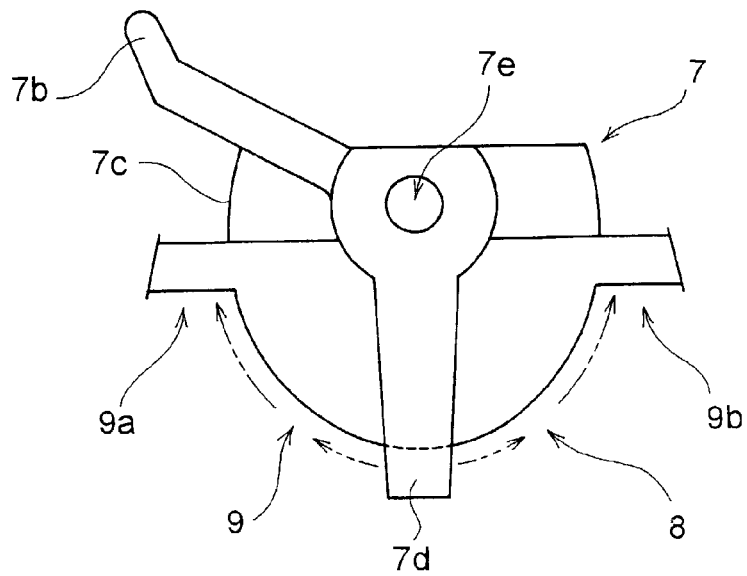
FIG. 3 is a diagram showing how the bracket fits in the side portion of a cabinet.

In FIG. 3, when the release lever 7b is rotated fully clockwise (in the direction E in FIG. 2), that is, until the disengagement-preventing claw 7d makes contact with the limit 9a, the projection 7a makes contact with the top surface 6b of the plate member 6 and presses it down against the resilience of the coil springs 5. As a result, the close-contact-type image sensor 3 is detached from the back roller 1. In this state, the user can remove a jammed document easily.

Figure 4:
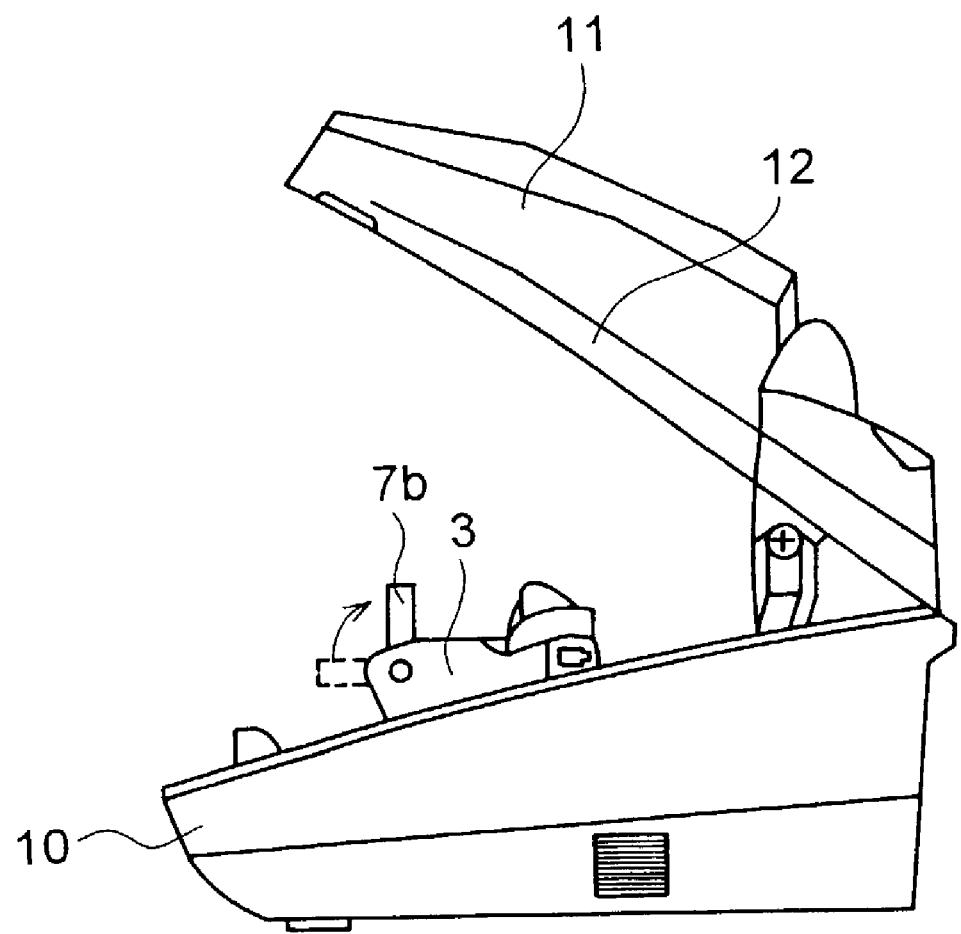
FIG. 4 is a side view of a facsimile machine incorporating the bracket of the invention.

FIG. 4 shows a facsimile machine incorporating the bracket 7 described above. In FIG. 4, reference numeral 10 represents the main unit of the facsimile machine, reference numeral 11 represents an operation panel unit pivotably fitted to the main unit 10 so that it can be freely opened and closed in such a way as to sandwich the document transport path between itself and the main unit 10 in an upper front portion thereof, and reference numeral 12 represents a cover frame, i.e., the frame of the operation panel unit 11. In this facsimile machine, in a lower portion of both sides of the cover frame 12, recesses are formed as lever rests. The release levers 7b formed integrally with the brackets 7 are accommodated compactly in these lever rests.

In the bracket 7 described above equipped with a paper release mechanism, the release lever 7b can be fitted so as to be rotateble about the shaft 2 of the back roller 1. This eliminates the need to fit extra parts as a paper releasing means; that is, only the bracket 7 needs to be prepared. This helps reduce the number of parts and greatly simplify assembly.

In particular, when the bracket 7 is fitted as shown in FIG. 4, as described above, the release lever 7b is accommodated compactly in a space secured in a side of the cover frame 12. Moreover, as shown in the same figure, the release lever 7b is exposed and can be operated by the user only when it needs to be operated to remove a jammed document, that is, only when the operation panel unit 11 is opened. Furthermore, when the operation panel unit 11 is closed from the open state, the recess formed as the lever rest in a side of the cover frame 12 makes contact with the tip of the release lever 7b and pushes it back to its nonfunctional position. Thus, even if the operator forgets to return the lever, as the operation panel unit 11 is closed, the lever is automatically moved back to its home position.

As will be clear from the descriptions given above, this embodiment has the following advantages:

(1) The release lever for releasing the back roller and the close-contact-type image sensor from a state in which they are pressed against each other is formed integrally with the bracket. This makes it possible to realize a paper release mechanism at low costs in a simple structure without requiring extra parts. Moreover, by operating the release lever, it is possible to remove a jammed document easily.

(2) The bracket is formed integrally with a projection for detaching the close-contact-type image sensor and the back roller from each other. This makes it possible to detach the close-contact-type image sensor and the back roller from each other in a simple structure without requiring extra parts.

(3) The bracket is formed integrally with a disengagement-preventing portion that is guided along a disengagement-preventing guide portion formed in the cabinet. This makes it possible to prevent the bracket from disengaging from the cabinet in a simple structure without requiring extra parts.

What is claimed is:

1. A bracket for rotatably supporting a shaft provided along an axis of a back roller for feeding and thereby transporting a document pinched between the back roller and a close-contact-type image sensor elastically supported on a cabinet, the bracket being fitted to the cabinet so as to be rotatable about the shaft, wherein the bracket is formed integrally with a release lever for releasing the back roller and the close-contact-type image sensor from a state in which the back roller and the close-contact-type image sensor are pressed against each other, and wherein the bracket is formed integrally with a disengagement preventing portion that is guided along a disengagement preventing guide portion formed in the cabinet.

2. A bracket as claimed in claim 1, Wherein the bracket has a projection formed thereon which, by making contact with the close contact type image sensor, detaches the close-contact-type image sensor from the back roller.

3. A document reading apparatus comprising:
a roller for feeding a document;
a shaft provided along an axis of the roller;
a bracket for rotatably supporting the shaft, the bracket being fitted to a cabinet so as to be rotatable about the shaft;
an image sensor of a contact type; and loading means for elastically supporting the image sensor so that the image sensor and the roller are kept pressed against each other, wherein the bracket has a release lever for releasing the roller and the image sensor from a state in which the roller and the image sensor are pressed against each other, a disengagement preventing portion that is guided along a disengagement preventing guide portion in the cabinet and a projection that, when the release lever is operated in a direction of rotation of the bracket, detaches the image sensor and the roller from each other against the elasticity of the loading means.

* * * * *